US010665218B2

(12) United States Patent
Zhao et al.

(10) Patent No.: US 10,665,218 B2
(45) Date of Patent: May 26, 2020

(54) AUDIO DATA PROCESSING METHOD AND DEVICE (71) Applicant: GUANGZHOU KUGOU COMPUTER TECHNOLOGY CO., LTD., Guangzhou (CN)

(72) Inventors: Weifeng Zhao, Guangzhou (CN); Xueqi Chen, Guangzhou (CN)

(73) Assignee: GUANGZHOU KUGOU COMPUTER TECHNOLOGY CO. LTD., Guangzhou, Guangdong Prov. (CN)

(*) Notice: Subject to any disclaimer, the term of this patent is extended or adjusted under 35 U.S.C. 154(b) by 163 days.

(21) Appl. No.: 15/968,670

(22) Filed: May 1, 2018

(65) Prior Publication Data
US 2018/0247629 A1    Aug. 30, 2018

Related U.S. Application Data (63) Continuation of application No. PCT/CN2016/104402, filed on Nov. 3, 2016.

(30) Foreign Application Priority Data

Nov. 3, 2015 (CN) .......................... 2015 1 0738376

(51) Int. Cl.
*G10H 1/36* (2006.01)
*G10H 1/00* (2006.01)
(Continued)

(52) U.S. Cl.
CPC ........... *G10H 1/361* (2013.01); *G10H 1/0008* (2013.01); *G10H 1/0091* (2013.01); *G10H 1/10* (2013.01);
(Continued)

(58) Field of Classification Search
CPC .... G10H 1/361; G10H 1/0008; G10H 1/0091; G10H 1/10; G10H 1/366; G10L 21/003
(Continued)

(56) References Cited

U.S. PATENT DOCUMENTS 4,527,274 A * 7/1985 Gaynor .................. G10L 13/02
704/260
5,621,538 A * 4/1997 Gnant .................... G10H 1/368
375/E7.271
(Continued)

FOREIGN PATENT DOCUMENTS

CN    101261865 A    9/2008
CN    101313477 A    11/2008
(Continued)

OTHER PUBLICATIONS

Guangzhou Kugou Computer Technology Co. Ltd., International Search Report and Written Opinion, PCT/CN2016/104402, dated Dec. 29, 2016, 14 pgs.
(Continued)

*Primary Examiner* — David S Warren
*Assistant Examiner* — Christina M Schreiber
(74) *Attorney, Agent, or Firm* — Morgan, Lewis & Bockius LLP (57) ABSTRACT The present disclosure provides an audio data processing method performed at an electronic apparatus, the method including: obtaining a corresponding lyric file according to audio data to be processed; dividing the audio data according to a sentence in the lyric file to obtain an audio data segment; extracting data corresponding to an end syllable in the audio data segment; and performing harmonic processing on the data corresponding to the end syllable. In addition, further provided is an audio data processing device matching the method. The audio data processing method and
(Continued)

device can prevent entire audio data from being attached with a harmonic sound effect during an entire time period, thereby improving authenticity of harmonic simulation.

18 Claims, 6 Drawing Sheets

(51) Int. Cl.
    *G10H 1/10*     (2006.01)
    *G10L 21/003*     (2013.01)
    *G10L 25/87*     (2013.01)
    *G10L 15/04*     (2013.01)

(52) U.S. Cl.
    CPC ........... *G10H 1/366* (2013.01); *G10L 21/003* (2013.01); *G10H 2210/005* (2013.01); *G10H 2210/061* (2013.01); *G10H 2210/066* (2013.01); *G10H 2210/251* (2013.01); *G10H 2210/331* (2013.01); *G10H 2220/011* (2013.01); *G10H 2240/325* (2013.01); *G10L 15/04* (2013.01); *G10L 25/87* (2013.01)

(58) Field of Classification Search
    USPC .......................................................... 84/610
    See application file for complete search history.

(56) References Cited

U.S. PATENT DOCUMENTS

| | | | | |
|---|---|---|---|---|
| 5,955,693 | A * | 9/1999 | Kageyama | G10H 1/366 84/610 |
| 7,915,511 | B2 * | 3/2011 | Korst | G10H 1/0008 84/609 |
| 8,304,642 | B1 * | 11/2012 | Bryan | G10H 1/0008 84/477 R |
| 9,620,092 | B2 * | 4/2017 | Wong | G10H 1/0025 |
| 2002/0193895 | A1 * | 12/2002 | Qian | G10L 21/06 700/94 |
| 2005/0123886 | A1 * | 6/2005 | Hua | G10H 1/361 434/307 A |
| 2007/0166683 | A1 * | 7/2007 | Chang | G09B 5/06 434/307 A |
| 2009/0120269 | A1 * | 5/2009 | Korst | G10H 1/0008 84/609 |
| 2009/0178544 | A1 * | 7/2009 | Reynolds | G09B 15/00 84/610 |
| 2009/0306987 | A1 * | 12/2009 | Nakano | G10H 1/366 704/260 |
| 2014/0244262 | A1 * | 8/2014 | Hisaminato | G10H 1/14 704/258 |
| 2015/0228264 | A1 * | 8/2015 | Zhu | G10H 1/0008 84/604 |
| 2018/0247629 | A1 * | 8/2018 | Zhao | G10L 21/003 |

FOREIGN PATENT DOCUMENTS

| | | | |
|---|---|---|---|
| CN | 103514874 | A | 1/2014 |
| CN | 105006234 | A * | 10/2015 |
| CN | 105006234 | A | 10/2015 |
| JP | 2015161710 | A | 9/2015 |

OTHER PUBLICATIONS

Guangzhou Kugou Computer Technology Co. Ltd., International Preliminary Report on Patentability, PCT/CN2016/104402, dated May 8, 2018, 4 pgs.

* cited by examiner

AUDIO DATA PROCESSING METHOD AND DEVICE

PRIORITY CLAIM AND RELATED APPLICATION

This application is a continuation application of PCT/CN2016/104402, entitled "AUDIO DATA PROCESSING METHOD AND DEVICE" filed on Nov. 3, 2016, which claims priority to Chinese Patent Application No. 201510738376.7, filed with the State Intellectual Property Office of the People's Republic of China on Nov. 3, 2015, entitled "AUDIO DATA PROCESSING METHOD AND DEVICE", both of which are incorporated herein by reference in their entirety.

TECHNICAL FIELD

The present disclosure relates to the field of computer application technologies, and in particular, to an audio data processing method and device.

BACKGROUND

As the development of media applications, more and more applications for editing audio data appear, and are no longer limited to implementing collection and playing of various pieces of audio data, but are more focused on edition of the audio data. A variety of audio data outputs are implemented by using collected audio data as an original sound.

For example, in a karaoke function provided for a user, the collected audio data are mostly edited and attached with a certain sound effect before outputting for a listener to listen. During edition of the audio data, if simulation of a harmonic sound effect is required to be implemented, the corresponding implementing mode is to use the collected audio data, i.e., the input human voice as the original sound, and superpose other human voices at a certain number and a certain ratio onto the original sound on this basis so as to obtain audio data to be output.

However, the implementation of the harmonic sound effect simulation is to attach the harmonic sound effect to the entire original sound, i.e., adding harmonic during the entire time period, which is contradict with the harmonic in a real scene, and has a limitation that the harmonic sound effect simulation is distorted.

SUMMARY

On this basis, it is necessary to provide an audio data processing method, which can prevent entire audio data from being attached with a harmonic sound effect during an entire time period, thereby improving authenticity of harmonic simulation.

In addition, it is also necessary to provide an audio data processing device, which can prevent entire audio data from being attached with a harmonic sound effect during an entire time period, thereby improving authenticity of harmonic simulation.

To solve the technical problem above, the following technical solutions are disclosed.

According to a first aspect of the present disclosure, an audio data processing method is performed at an electronic apparatus having one or more processors and memory storing a plurality of program instructions be executed by the one or more processors, the method comprising:

obtaining a corresponding lyric file according to audio data to be processed;
dividing the audio data according to a sentence in the lyric file to obtain an audio data segment;
extracting data corresponding to an end syllable in the audio data segment; and
performing harmonic processing on data corresponding to the end syllable.

According to a second aspect of the present disclosure, an electronic apparatus has one or more processors, memory coupled to the one or more processors, and a plurality of program instructions stored in the memory that, when executed by the one or more processors, cause the electronic apparatus to perform the aforementioned method.

According to a third aspect of the present disclosure, a non-transitory computer readable storage medium stores a plurality of program instructions in connection with an electronic apparatus having one or more processors. The plurality of program instructions, when executed by the one or more processors, cause the electronic apparatus to perform the aforementioned method.

As can be known from the technical solutions above, for any audio data requiring harmonic simulation, first a lyric file corresponding to the audio data is obtained; the audio data is divided according to a sentence in the lyric file to obtain an audio data segment; and data corresponding to an end syllable in the audio data segment is extracted to perform harmonic processing on the data. That is to say, during edition of the audio data, harmonic is performed only on the data corresponding to the end syllable in the audio data, rather than on the entire audio data during the entire time period, thereby enabling the achieved harmonic simulation to be consistent with the harmonic executed during actual singing, so as to improve authenticity of harmonic simulation.

DETAILED DESCRIPTION OF EMBODIMENTS

Typical embodiments embodying the features and advantages of the present disclosure would be explained as follows in the description in detail. It should be understood that the present disclosure may include various changes in different embodiments which all would not depart from the scope of the present disclosure. Moreover, the description and drawings therein are essentially used for explanation, rather than limiting the present disclosure.

As stated above, during various editions of the audio data, if a harmonic sound effect is required to be attached to the input human voice, it is necessary to be performed on the entire input human voice, i.e., adding the harmonic sound effect to the entire input human voice. Hence, although during existing audio data editing, a required sound effect can be added to any piece of input audio data, for the harmonic sound effect, other human voices are only superposed into the audio data directly and ponderously, so that the entire audio data are all attached with the harmonic sound effect. Although the purpose of harmonic is achieved, authenticity is missing, and the harmonic sound effect in the real scene cannot be presented.

Hence, to ensure authenticity of simulation, and present the harmonic sound effect in a real scene, an audio data processing method is particularly provided. The audio data processing method can be implemented by a computer program. Correspondingly, an audio data processing device constructed thereby can be stored in an electronic apparatus and can be operated in the electronic apparatus, so as to further implement the harmonic of any piece of audio data.

Figure 1:
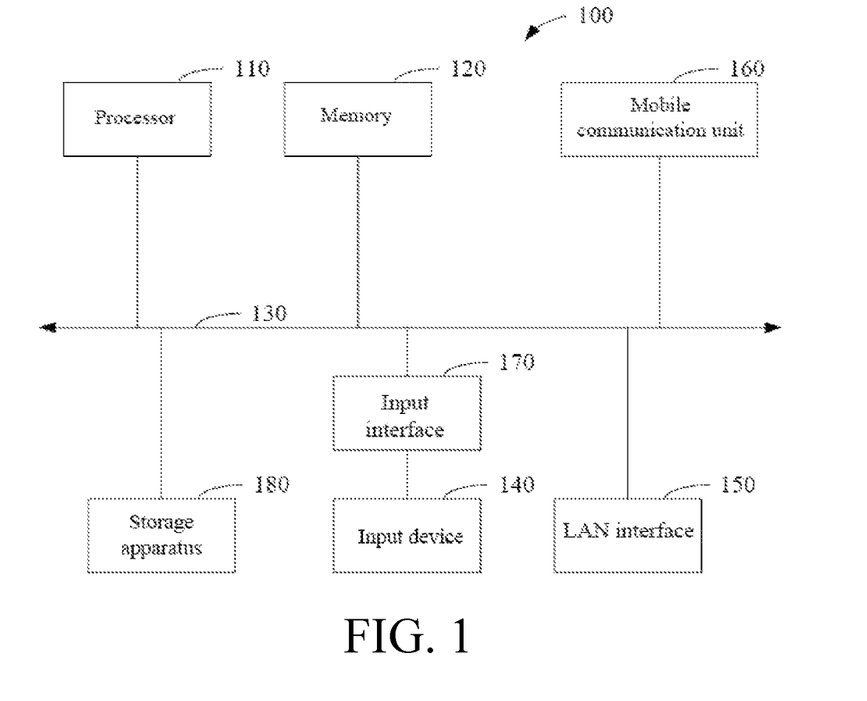
FIG. 1 is a schematic structure diagram of an electronic apparatus provided in an embodiment of the present disclosure.

FIG. 1 shows a structure of an electronic apparatus provided in an embodiment of the present disclosure. The electronic apparatus 100 is merely an example adapted to the present disclosure, and cannot be considered as providing any limitation to the use scope of the present disclosure. The electronic apparatus 100 cannot be explained as depending on or having a combination of one or more components of the shown exemplary electronic apparatus 100, either.

As shown in FIG. 1, the electronic apparatus 100 includes a processor 110, a memory 120, a local area network (LAN) interface 150, a mobile communication unit 160, and a system bus 130. Various assemblies including the memory 120 and the processor 110 would be connected onto the system bus 130. The processor 110 is hardware for executing computer program instructions using basic arithmetic and logic operations in a computer system. The memory 120 is a physical apparatus for temporarily or permanently storing computer programs or data.

Multiple pieces of audio data and various lyric files are stored in the memory 120. The processor 110 would execute the program instructions stored in the memory 120.

A portable terminal apparatus 100 further includes various input interfaces 170 and input devices 140 to implement input of various operations. The input device 140 may be at least one of touch screens, keys, keyboards, and mice.

The portable terminal apparatus 100 further includes a storage apparatus 180 that may be selected from various computer readable storage media. The computer readable storage media refer to any usable media that can be accessed, including two media, i.e., mobile and fixed media. For instance, the computer readable media include, but not limited to, a flash memory (micro-SD card), a CD-ROM, a Digital Versatile Disc (DVD), or other discs, cassettes, magnetic tape storage or other storage devices, or any other media that can be used to store required information and can be accessed.

As detailed description stated above, the electronic apparatus 100 adapted to the present disclosure would execute a specified operation that implements the harmonic sound effect. That is, the specified operation is executed through running the program instructions in the memory 120 by the processor 110 so as to implement processing of audio data in the electronic apparatus 100.

In addition, the present disclosure may also be implemented through a hardware circuit or a combination of the hardware circuit and a software instruction. Therefore, implementing the present disclosure is not limited to any specific hardware circuit, software or a combination thereof.

Figure 2:
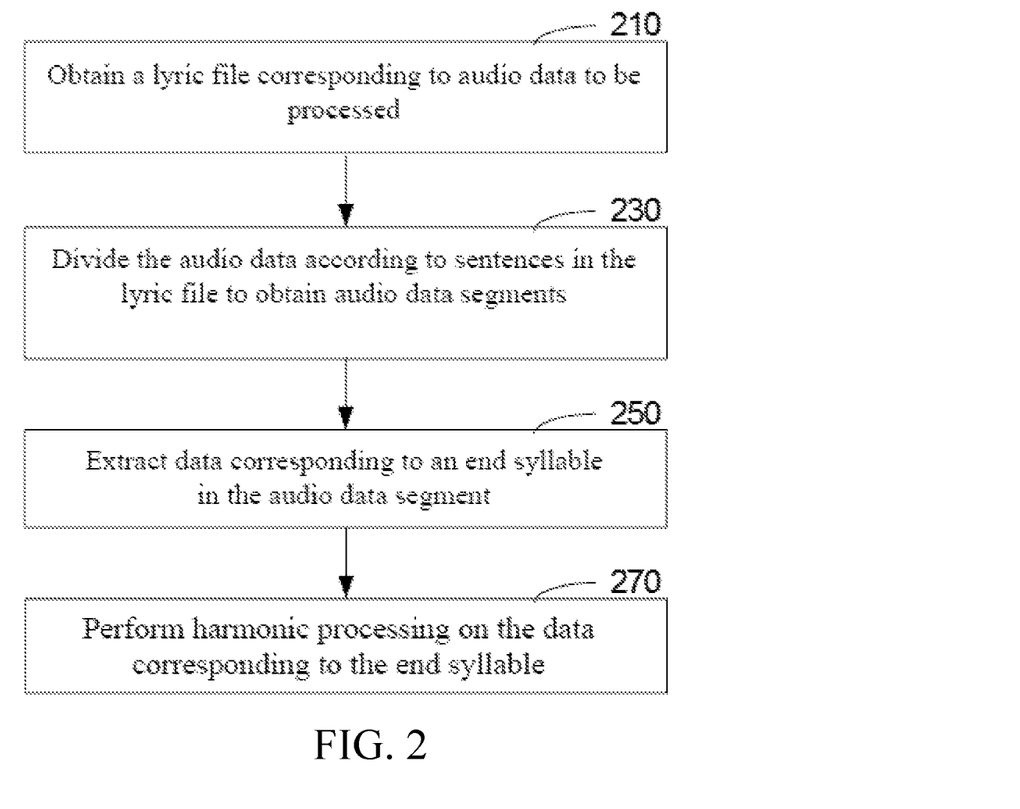
FIG. 2 is a flow chart of an audio data processing method in an embodiment.

In an embodiment, specifically, the audio data processing method as shown in FIG. 2 includes:

Step 210: obtain a corresponding lyric file according to audio data to be processed.

The audio data is audio data that is currently edited, may be audio data recorded when a user is singing a certain song, and may also be audio data recorded in advance when the user sings the certain song in advance. Hence, edition of the audio data may be executed in real time and may also be subsequent edition of the audio data.

Corresponding lyric file is obtained according to the song of the audio data so as to perform harmonic simulation on the audio data based on the lyric file.

Step 230: divide the audio data according to a sentence in the lyric file to obtain an audio data segment.

The content of the lyric file includes each sentence of lyrics of a song and various related time points. Hence, the audio data can be divided according to the sentence of the lyric file, i.e., dividing the audio data to obtain an audio data segment corresponding to the sentence. For example, if the audio data is recorded for an entire song, it is divided according to the sentence in the lyrics file, to obtain the audio data segment corresponding to each sentence.

If the audio data is recorded currently in real time, it is divided according to the corresponding sentence in the lyric file, to continuously divide the audio data as the audio data is continuously recorded, so as to obtain the audio data segments.

Step 250: extract data corresponding to an end syllable in the audio data segment.

Data is extracted according to the end syllable in the audio data segment to obtain the data corresponding to the end syllable. Hence, for the multiple audio data segments obtained through division, data corresponding to the end syllable in each piece of audio data is obtained.

Step 270: perform harmonic processing on data corresponding to the end syllable.

Harmonic processing is only performed on the data corresponding to the end syllable in the audio data segment to obtain the audio data segment where harmonic sound effect simulation is only performed on the end syllable, so that the audio data segment constitutes the audio data of harmonic sound effect simulation, the output audio data is attached with the harmonic sound effect, and the harmonic sound effect simulation is only performed on the end syllable part in the output audio data, so as to be consistent with the harmonic in a real scene, thereby ensuring authenticity of harmonic simulation.

Figure 3:
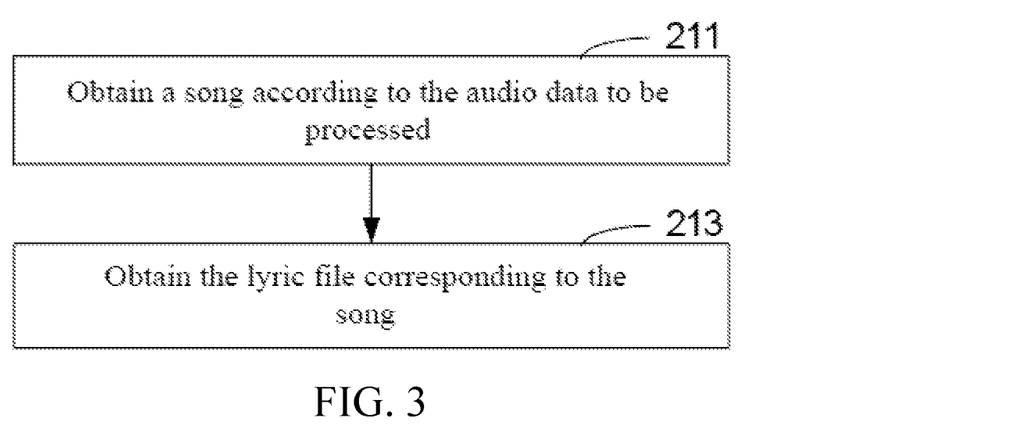
FIG. 3 is a flow chart of a method for obtaining a corresponding lyric file according to audio data to be processed in FIG. 2.

Furthermore, in this embodiment, as shown in FIG. 3, in an embodiment, Step 210 includes:

Step 211: obtain a song according to the audio data to be processed.

Step 213: obtain the lyric file corresponding to the song.

The lyric file corresponding to the audio data may be in any form, but the content thereof necessarily includes multiple sentences and start and end time points corresponding to each sentence, i.e., start time and end time of each sentence.

Furthermore, in actual operations, the content in the lyric file includes a character corresponding to the lyric and a time point corresponding to the character. Herein, characters respectively corresponding to the head and end of each sentence are first determined, thereby obtaining time points corresponding to the head and end of the sentence. The time points corresponding to the head and end of the sentence are the start time and end time of the sentence.

Figure 4:
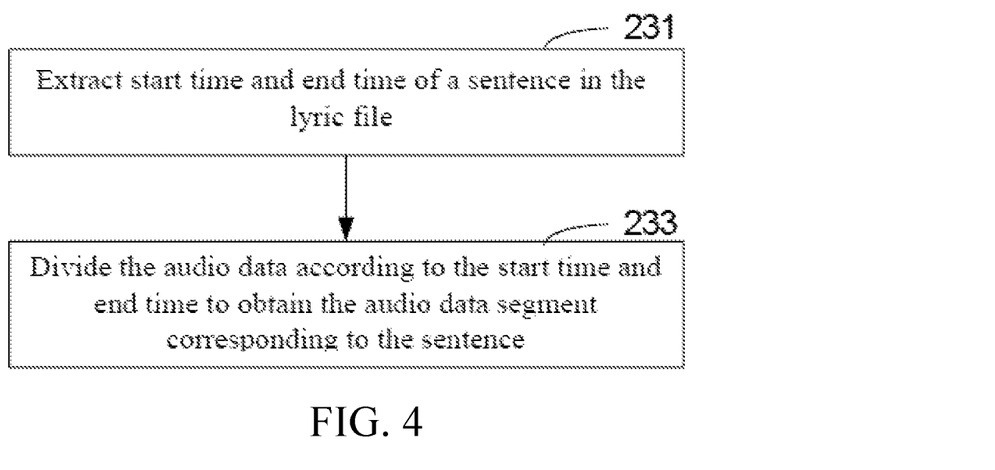
FIG. 4 is a flow chart of a method for dividing audio data according to a sentence in the lyric file to obtain an audio data segment in FIG. 2.

In an embodiment, as shown in FIG. 4, step 230 includes:

Step 231: extract start time and end time of a sentence in the lyric file.

The start time and end time of the sentence in the lyric file are extracted and time is used as a boundary for distinguishing the sentences.

It should be noted that if an interval exists between the sentences in the lyric file, the interval may belong to the end of the last sentence or the head of the next sentence. Correspondingly, the end time would be the time corresponding to an end of the interval or the start time is the time corresponding to a head of the interval.

Step 233: divide the audio data according to the start time and end time to obtain the audio data segment corresponding to the sentence.

The time in the audio file is consistent with the time in the lyric file. Hence, the audio data segment corresponding to the sentence can be obtained through division according to the time in the lyric file.

That is to say, for the audio data recorded when singing a song, the singing content corresponds to the lyric and time point in the lyric file, and therefore, the data in the same time period as the sentence in the lyric file is the audio data segment corresponding to the sentence.

For example, the end syllable for a sentence of lyrics lasts for 3 seconds, and therefore, 3 seconds in the audio data segment corresponding to the sentence of lyrics is data corresponding to the 15th to 18th second in the audio data segment. The data corresponding to the 15th to 18th second in the audio data segment is data corresponding to the end syllable in the audio data segment.

Furthermore, in this embodiment, step 250 includes: extract data corresponding to the end syllable in the audio data segment according to a preset end syllable length value.

The end syllable length value is preset, and is a time value to represent a time length corresponding to the end syllable. Preferably, the end syllable length value may be preset as 3 seconds.

The data corresponding to the end syllable can be determined according to the preset end syllable length value in each audio data segment, to be further extracted directly. That is to say, data with an end time length matching the end syllable length value in each audio data segment is the data corresponding to the end syllable.

Figure 5:
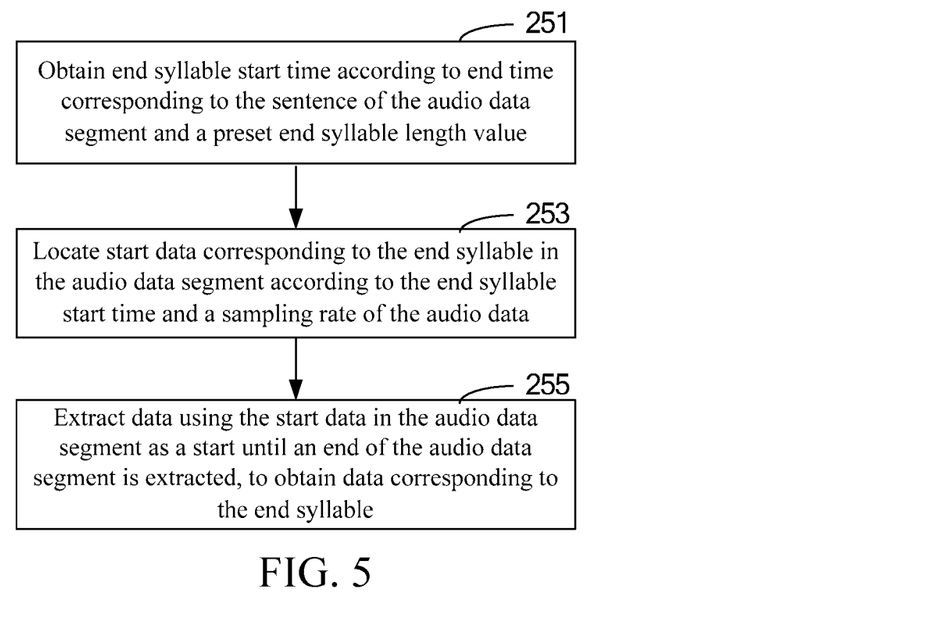
FIG. 5 is a flow chart of a method for extracting data corresponding to an end syllable in the audio data segment according to a preset end syllable length value in an embodiment.

Furthermore, in this embodiment, as shown in FIG. 5, the step of extracting data corresponding to the end syllable in the audio data segment according to a preset end syllable length value includes:

Step 251: obtain end syllable start time according to the end time corresponding to the sentence of the audio data segment and the preset end syllable length value.

Through the audio data division executed based on the start time and the end time, the divided audio data segment corresponds to the sentence in the lyric file. Hence, each audio data segment has corresponding sentence, thereby obtaining the end time corresponding to the sentence.

A difference between the end time and the preset end syllable length value is the end syllable start time. The end syllable start time would be used as a start point for extracting the data corresponding to the end syllable in the audio data segment.

Step 253: locate start data corresponding to the end syllable in the audio data segment according to the end syllable start time and a sampling rate of the audio data.

Each piece of data in the audio data segment includes corresponding time, that is to say, the time corresponding thereto may be determined based on a position thereof in the audio data and a sampling rate, i.e., t=n/fs, wherein t is the time corresponding to the data, n is a coordinate of the data in the audio data, and fs is the sampling rate of the audio data.

Hence, based on the end syllable start time and the sampling rate of the audio data, the corresponding coordinates in the audio data with the time being the end syllable start time can be obtained through calculation, thereby locating the data in the audio data segment to obtain start data corresponding to the end syllable.

Step 255: extract data using the start data in the audio data segment as a start until an end of the audio data segment is extracted, to obtain the data corresponding to the end syllable.

In the audio data segment, directly taking the start data as a start to successively extract data backwards until the end of the audio data segment is extracted. Hence, the obtained data is the data corresponding to the end syllable, so as to perform harmonic on the extracted data subsequently.

Through the process as stated above, the audio data segments obtained through division are all extracted to obtain the data corresponding to the end syllable. Further, harmonic sound effect simulation in each audio data segment is implemented by the data, thereby completing the harmonic sound effect simulation in the entire audio data and improving authenticity of the sound effect simulation.

It should be noted that if an interval between sentences belongs to the audio data segment corresponding to the last sentence, the extracting process of the data corresponding to the end syllable is a data extracting process between the start data and an interval end. That is to say, for the audio data segment attached with an interval, data extraction is also successively executed backwards based on the start data. Hence, data corresponding to the end syllable including the interval is obtained.

In the subsequent harmonic processing, harmonic processing can be directly performed on the data corresponding to the end syllable including the interval.

Figure 6:
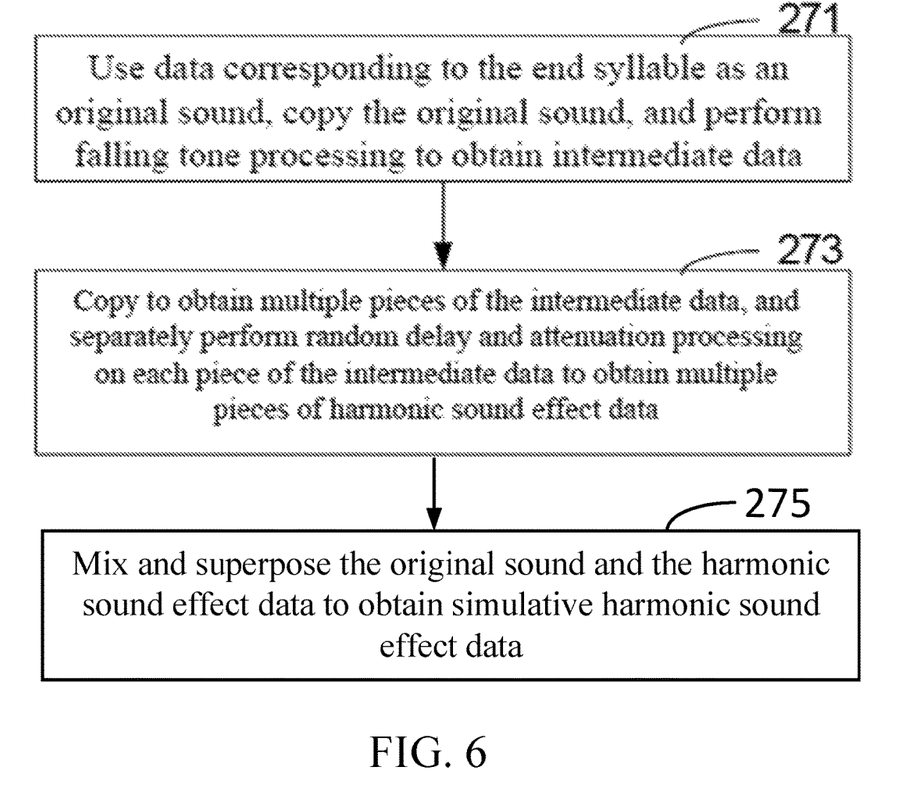
FIG. 6 is a flow chart of a method for performing harmonic processing on data corresponding to the end syllable in FIG. 2.

In an embodiment, as shown in FIG. 6, step 270 includes:

Step 271: use data corresponding to the end syllable as an original sound, copy the original sound, and perform falling tone processing to obtain intermediate data.

Copy a piece of data corresponding to the end syllable, use the data corresponding to any end syllable as the original sound, perform falling tone processing on data corresponding to another end syllable to obtain the intermediate data. An algorithm for implementing falling tone processing may be any algorithm related to pitch shift.

Step 273: copy the intermediate data to obtain multiple pieces of the intermediate data, and separately perform random delay and attenuation processing on each piece of the intermediate data to obtain multiple pieces of harmonic sound effect data.

Data corresponding to the end syllable used as the original sound and the intermediate data are obtained through said steps. At this moment, the intermediate data s'(n) is copied to L pieces, each of which is added with a random delay and a random attenuation, i.e., s"=r*s'(n−P), wherein r is a pure decimal, P is a positive number, and s" is any piece of harmonic sound effect data.

Step 275: mix and superpose the original sound and the harmonic sound effect data to obtain simulative harmonic sound effect data.

L pieces of s" are superposed with the original sound so as to obtain the end syllable with simulative harmonic in the audio data segment, thereby implementing harmonic simulation in the audio data segment. Multiple audio data segments are spliced together to obtain the audio data to be output.

If the data corresponding to the end syllable including the interval is used as the original sound, the harmonic sound effect data is also obtained by processing the data corresponding to the end syllable including the interval, a part, in the data corresponding to the end syllable, corresponding to the interval is null, and correspondingly, and a part, in the harmonic sound effect data, corresponding to the interval is also null. Hence, during superposing the original sound and the harmonic sound effect data, the null parts would also be superposed together to obtain the end syllable with simulated harmonic and still comprising the interval. Therefore, simulation of harmonic in the end syllable is achieved, and no influence would be applied to the interval existing in the original audio data.

In a specific application, for the audio data processing method above, it is required to first obtain a corresponding lyric file, and regarding start time s(m) and end time d(m) of each sentence in the lyric file, m represents the $m^{th}$ sentence in the lyric file. The start time s(m) and the end time d(m) are also a start point and an end point of an audio data segment corresponding to the sentence.

Assume the audio data to be processed is x(n), n is an integer less than N, and the total length of the audio data is N.

The preset end syllable length value is T, T=3 seconds, and thus the start time ts(m) of the end syllable in the audio data segment is obtained, i.e., ts(m)=d(m)−T. Therefore, data s(n) corresponding to the end syllable in each audio data segment is respectively aggregated.

Copy a piece of s(n), and perform falling tone processing on the s(n) obtained through copying to obtain intermediate data s'(n).

At this moment, copy L pieces of the intermediate data s'(n), each of which is added with a random delay and random attenuation, i.e., s"=r*s'(n−P), wherein r is a pure decimal, and P is a positive number.

Superpose L pieces of s" and s(n) to obtain simulative harmonic end syllable y(n).

Harmonic simulation on the end syllable of the audio data is accurately implemented through the process above.

By means of the audio data processing method above, harmonic simulation can be implemented on the audio data in various audio applications, for example, a karaoke application, which greatly enriches functions of the audio applications.

Figure 7:
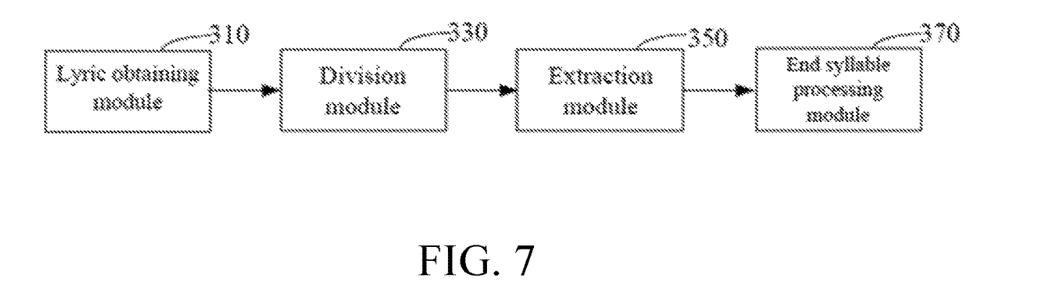
FIG. 7 is a schematic structure diagram of an audio processing device in an embodiment.

In an embodiment, an audio data processing device is correspondingly provided. As shown in FIG. 7, the device includes a lyric obtaining module 310, a division module 330, an extraction module 350, and an end syllable processing module 370.

The lyric obtaining module 310 is configured to obtain a corresponding lyric file according to audio data to be processed.

The division module 330 is configured to divide the audio data according to a sentence in the lyric file to obtain an audio data segment.

The extraction module 350 is configured to extract data corresponding to an end syllable in the audio data segment.

The end syllable processing module 370 is configured to perform harmonic processing on the data corresponding to the end syllable.

Figure 8:
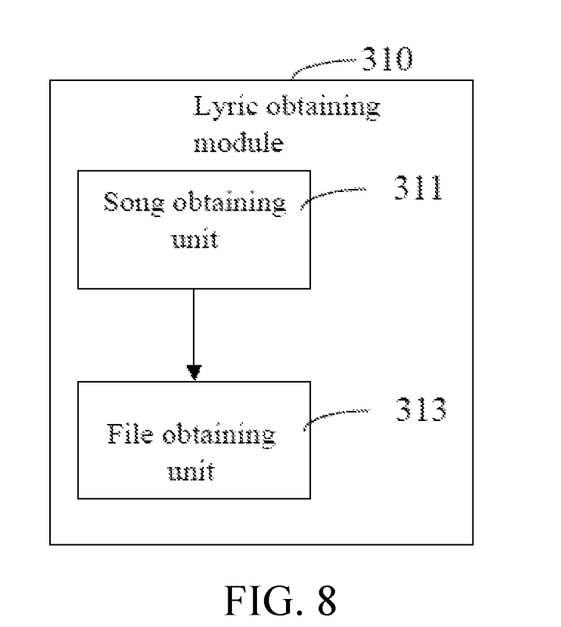
FIG. 8 is a schematic structure diagram of a lyric obtaining module in FIG. 7.

In an embodiment, as shown in FIG. 8, the lyric obtaining module 310 includes a song obtaining unit 311 and a file obtaining unit 313, wherein:

the song obtaining unit 311 is configured to obtain a song according to the audio data to be processed; and the file obtaining unit 313 is configured to obtain the lyric file corresponding to the song.

Figure 9:
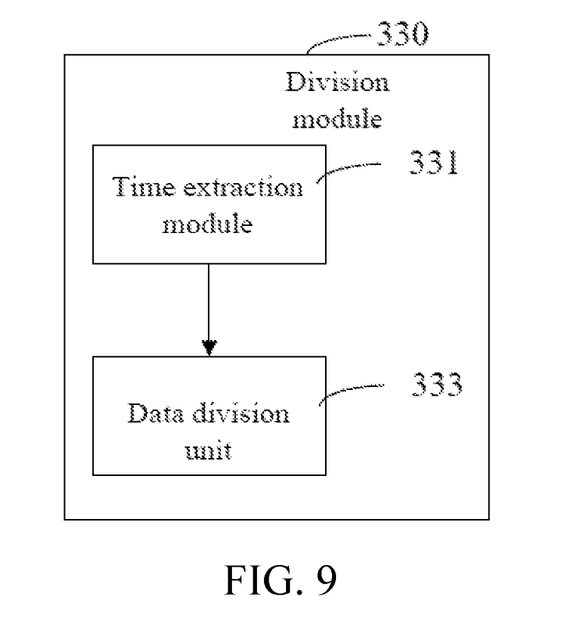
FIG. 9 is a schematic structure diagram of a division module in FIG. 7.

In an embodiment, as shown in FIG. 9, the division module 330 includes a time extraction module 331 and a data division unit 333.

The time extraction unit 331 is configured to extract start time and end time of a sentence in the lyric file.

The data division unit 333 is configured to divide the audio data according to the start time and the end time to obtain the audio data segment corresponding to the sentence.

In an embodiment, the extraction module 350 is further configured to extract data corresponding to the end syllable in the audio data segment according to a preset end syllable length value.

Figure 10:
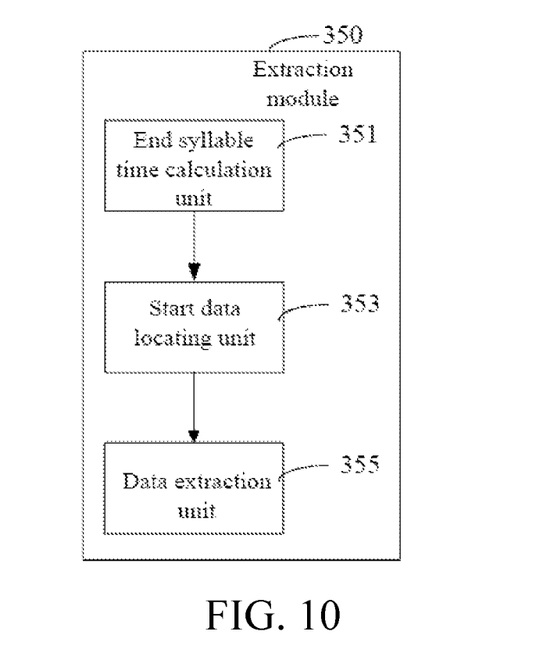
FIG. 10 is a schematic structure diagram of an extraction module in FIG. 7.

Furthermore, in this embodiment, as shown in FIG. 10, the extraction module 350 includes an end syllable calculation unit 351, a start data locating unit 353, and a data extraction unit 355.

The end syllable time calculation unit 351 is configured to obtain end syllable start time according to the end time corresponding to the sentence of the audio data segment and the preset end syllable length value.

The start data locating unit 353 is configured to locate start data corresponding to the end syllable in the audio data segment according to the end syllable start time and a sampling rate of the audio data.

The data extraction unit 355 is configured to extract data using the start data in the audio data segment as a start until an end of the audio data segment is extracted, to obtain the data corresponding to the end syllable.

Figure 11:
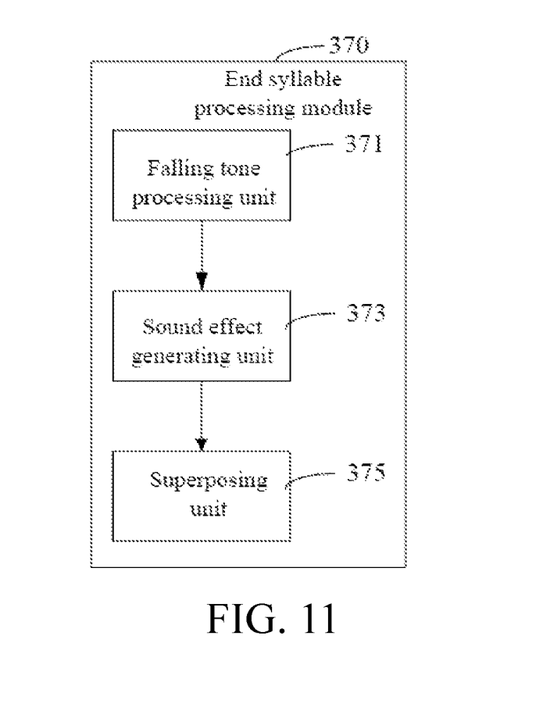
FIG. 11 is a schematic structure diagram of an end syllable processing module in FIG. 7.

In an embodiment, as shown in FIG. 11, the end syllable processing module 370 includes a falling tone processing unit 371, a sound effect generating unit 373, and a superposing unit 375.

The falling tone processing unit 372 is configured to use data corresponding to the end syllable as an original sound, copy the original sound, and perform falling tone processing to obtain intermediate data.

The sound effect generating unit 373 is configured to copy the intermediate data to obtain multiple pieces of the intermediate data, and separately perform random delay and attenuation processing on each piece of intermediate data to obtain multiple pieces of harmonic sound effect data.

The superposing unit 375 is configured to mix and superpose the original sound and the harmonic sound effect data to obtain simulative harmonic audio data.

A person of ordinary skill in the art can understand that all or some of steps of the aforementioned embodiments can be achieved by hardware or by programs through instructing related hardware. The programs can be stored in a non-transitory computer readable storage medium. The abovementioned storage medium can be a read-only memory, a magnetic disk or optical disk and so on.

Although the present disclosure is described with reference to several typical embodiments, it should be understood that the used terms are illustrative and exemplary, rather than limitative. Since the present disclosure can be specifically implemented in various forms without departing from the spirit or essence of the invention, it should be understood that the aforementioned embodiments are not limited to any details above, and should be explained widely within the spirit and scope defined in the appended claims. Hence, all variations and modifications falling within the claims or equivalent scopes thereof should be covered by the appended claims.

The invention claimed is:

1. An audio data processing method performed at an electronic apparatus having one or more processors and memory storing a plurality of program instructions to be executed by the one or more processors, the method comprising:
    obtaining a corresponding lyric file according to audio data to be processed;
    dividing the audio data according to a sentence in the lyric file to obtain an audio data segment;
    extracting data corresponding to an end syllable in the audio data segment; and
    performing harmonic processing on the data corresponding to the end syllable.

2. The method according to claim 1, wherein the step of obtaining a corresponding lyric file according to audio data to be processed comprises:
    obtaining a song according to the audio data to be processed; and
    obtaining a lyric file corresponding to the song.

3. The method according to claim 1, wherein the step of dividing the audio data according to a sentence in the lyric file to obtain an audio data segment comprises:
    extracting start time and end time of a sentence in the lyric file; and
    dividing the audio data according to the start time and the end time to obtain an audio data segment corresponding to the sentence.

4. The method according to claim 3, wherein the step of extracting data corresponding to an end syllable in the audio data segment comprises:
    extracting data corresponding to the end syllable in the audio data segment according to a preset end syllable length value.

5. The method according to claim 4, wherein the step of extracting data corresponding to the end syllable in the audio data segment according to a preset end syllable length value comprises:
    obtaining end syllable start time according to end time corresponding to the sentence of the audio data segment and the preset end syllable length value;
    locating start data corresponding to the end syllable in the audio data segment according to the end syllable start time and a sampling rate of the audio data; and
    extracting data using the start data in the audio data segment as a start until an end of the audio data segment is extracted, to obtain data corresponding to the end syllable.

6. The method according to claim 1, wherein the step of performing harmonic processing on the data corresponding to the end syllable comprises:
    using data corresponding to the end syllable as an original sound, copying the original sound, and performing falling tone processing to obtain intermediate data;
    copying the intermediate data and obtaining multiple pieces of the intermediate data;
    performing random delay and attenuation processing on each piece of intermediate data to obtain multiple pieces of harmonic sound effect data; and
    mixing and superposing the original sound and the harmonic sound effect data to obtain simulative harmonic audio data.

7. An electronic apparatus having one or more processors, memory coupled to the one or more processors, and a plurality of program instructions stored in the memory that, when executed by the one or more processors, cause the electronic apparatus to perform the following operations:
    obtaining a corresponding lyric file according to audio data to be processed;
    dividing the audio data according to a sentence in the lyric file to obtain an audio data segment;
    extracting data corresponding to an end syllable in the audio data segment; and
    performing harmonic processing on the data corresponding to the end syllable.

8. The electronic apparatus according to claim 7, wherein the operation of obtaining a corresponding lyric file according to audio data to be processed comprises:
    obtaining a song according to the audio data to be processed; and
    obtaining a lyric file corresponding to the song.

9. The electronic apparatus according to claim 7, wherein the operation of dividing the audio data according to a sentence in the lyric file to obtain an audio data segment comprises:
    extracting start time and end time of a sentence in the lyric file; and
    dividing the audio data according to the start time and the end time to obtain an audio data segment corresponding to the sentence.

10. The electronic apparatus according to claim 9, wherein the operation extracting data corresponding to an end syllable in the audio data segment comprises:
    extracting data corresponding to the end syllable in the audio data segment according to a preset end syllable length value.

11. The electronic apparatus according to claim 10, wherein the operation of extracting data corresponding to the end syllable in the audio data segment according to a preset end syllable length value comprises:
    obtaining end syllable start time according to end time corresponding to the sentence of the audio data segment and the preset end syllable length value;
    locating start data corresponding to the end syllable in the audio data segment according to the end syllable start time and a sampling rate of the audio data; and
    extracting data using the start data in the audio data segment as a start until an end of the audio data segment is extracted, to obtain data corresponding to the end syllable.

12. The electronic apparatus according to claim 7, wherein the operation of performing harmonic processing on the data corresponding to the end syllable comprises:
    using data corresponding to the end syllable as an original sound, copying the original sound, and performing falling tone processing to obtain intermediate data;
    copying the intermediate data and obtaining multiple pieces of the intermediate data;

performing random delay and attenuation processing on each piece of intermediate data to obtain multiple pieces of harmonic sound effect data; and mixing and superposing the original sound and the harmonic sound effect data to obtain simulative harmonic audio data.

13. A non-transitory computer readable storage medium storing a plurality of program instructions in connection with an electronic apparatus having one or more processors, wherein the plurality of program instructions, when executed by the one or more processors, cause the electronic apparatus to perform the following operations:

obtaining a corresponding lyric file according to audio data to be processed;

dividing the audio data according to a sentence in the lyric file to obtain an audio data segment;

extracting data corresponding to an end syllable in the audio data segment; and performing harmonic processing on the data corresponding to the end syllable.

14. The non-transitory computer readable storage medium according to claim 13, wherein the operation of obtaining a corresponding lyric file according to audio data to be processed comprises:

obtaining a song according to the audio data to be processed; and obtaining a lyric file corresponding to the song.

15. The non-transitory computer readable storage medium according to claim 13, wherein the operation of dividing the audio data according to a sentence in the lyric file to obtain an audio data segment comprises:

extracting start time and end time of a sentence in the lyric file; and dividing the audio data according to the start time and the end time to obtain an audio data segment corresponding to the sentence.

16. The non-transitory computer readable storage medium according to claim 15, wherein the operation extracting data corresponding to an end syllable in the audio data segment comprises:

extracting data corresponding to the end syllable in the audio data segment according to a preset end syllable length value.

17. The non-transitory computer readable storage medium according to claim 16, wherein the operation of extracting data corresponding to the end syllable in the audio data segment according to a preset end syllable length value comprises:

obtaining end syllable start time according to end time corresponding to the sentence of the audio data segment and the preset end syllable length value;

locating start data corresponding to the end syllable in the audio data segment according to the end syllable start time and a sampling rate of the audio data; and extracting data using the start data in the audio data segment as a start until an end of the audio data segment is extracted, to obtain data corresponding to the end syllable.

18. The non-transitory computer readable storage medium according to claim 13, wherein the operation of performing harmonic processing on the data corresponding to the end syllable comprises:

using data corresponding to the end syllable as an original sound, copying the original sound, and performing falling tone processing to obtain intermediate data;

copying the intermediate data and obtaining multiple pieces of the intermediate data;

performing random delay and attenuation processing on each piece of intermediate data to obtain multiple pieces of harmonic sound effect data; and mixing and superposing the original sound and the harmonic sound effect data to obtain simulative harmonic audio data.

* * * * *